United States Patent
Yamaji et al.

(10) Patent No.: US 8,887,091 B2
(45) Date of Patent: Nov. 11, 2014

(54) INFORMATION PROCESSING APPARATUS, METHOD, PROCESSOR, AND RECORDING MEDIUM FOR DETERMINING WHETHER INFORMATION STORED IN A MEMORY IS INCORRECTLY UPDATED

(75) Inventors: Hidenori Yamaji, Tokyo (JP); Akira Hirai, Nara (JP); Takuya Nishibayashi, Chiba (JP)

(73) Assignee: Sony Corporation (JP)

( * ) Notice: Subject to any disclaimer, the term of this patent is extended or adjusted under 35 U.S.C. 154(b) by 1177 days.

(21) Appl. No.: 12/002,352

(22) Filed: Dec. 17, 2007

(65) Prior Publication Data

US 2008/0163050 A1 Jul. 3, 2008

(30) Foreign Application Priority Data

Dec. 28, 2006 (JP) ................. P2006-355322

(51) Int. Cl.
*G06F 3/048* (2013.01)

(52) U.S. Cl.
USPC ............... 715/809; 715/764; 713/1; 713/2; 714/23; 714/42; 714/48; 714/54; 714/57

(58) Field of Classification Search
USPC ............ 715/700; 713/1, 2; 714/100, 1, 25, 35, 714/48, 54, 57, 42, 23
See application file for complete search history.

(56) References Cited

U.S. PATENT DOCUMENTS

| | | | | |
|---|---|---|---|---|
| 5,815,702 | A * | 9/1998 | Kannan et al. | 714/15 |
| 5,991,856 | A * | 11/1999 | Spilo et al. | 711/147 |
| 6,240,531 | B1 * | 5/2001 | Spilo et al. | 714/38 |
| 7,096,472 | B2 | 8/2006 | Machida et al. | |
| 7,243,267 | B2 * | 7/2007 | Klemm et al. | 714/38.11 |
| 8,645,760 | B2 * | 2/2014 | van Gilluwe | 714/48 |
| 2006/0101413 | A1 * | 5/2006 | Kinno et al. | 717/127 |
| 2006/0271916 | A1 * | 11/2006 | Abe | 717/128 |
| 2006/0271918 | A1 * | 11/2006 | Abe | 717/131 |

FOREIGN PATENT DOCUMENTS

| | | | |
|---|---|---|---|
| JP | 63-008834 | A | 1/1988 |
| JP | 2001-229032 | A | 8/2001 |
| JP | 2001-290661 | A | 10/2001 |
| JP | 2002-055851 | A | 2/2002 |

(Continued)

OTHER PUBLICATIONS

English translation of Japanese Office Action issued on Jan. 5, 2010, issued in Japanese Patent Application No. 2006-355322.

(Continued)

*Primary Examiner* — Dino Kujundzic
(74) *Attorney, Agent, or Firm* — Lerner, David, Littenberg, Krumholz & Mentlik, LLP

(57) ABSTRACT

An information processing apparatus includes a determination unit configured to determine whether incorrect updating processing in which information stored in a memory of the information processing apparatus is incorrectly updated has been executed in a first application program for receiving an instruction issued by a user and for controlling execution of processing corresponding to the instruction; a forcible termination unit configured to, when the determination unit determines that the incorrect updating processing has been executed, forcibly terminate the first application program; and a restart control unit configured to, when the determination unit determines that the incorrect updating processing has been executed, after the forcible termination unit terminates the first application program, notify the user of the occurrence of the incorrect updating. processing and control execution of a second application program for receiving an instruction relating to restart of the information processing apparatus.

7 Claims, 8 Drawing Sheets

(56) References Cited

FOREIGN PATENT DOCUMENTS

| | | |
|---|---|---|
| JP | 2002-063051 A | 2/2002 |
| JP | 2002-149437 A | 5/2002 |
| JP | 2002-157132 A | 5/2002 |
| JP | 2002-342095 A | 11/2002 |
| JP | 2004-070593 A | 3/2004 |
| JP | 2006-053788 A | 2/2006 |
| JP | 2006-092055 A | 4/2006 |
| WO | 2005/099250 A1 | 10/2005 |

OTHER PUBLICATIONS

Mac self-protection technique that is learned by Ms. Sanagi's failure, Mack-like trouble solution handbook, Nikkei Mac vol. 7 No. 7, Japan, Nikkei BP, Inc., Jun. 18, 1999, vol. 7, p. 108-110.

* cited by examiner

INFORMATION PROCESSING APPARATUS, METHOD, PROCESSOR, AND RECORDING MEDIUM FOR DETERMINING WHETHER INFORMATION STORED IN A MEMORY IS INCORRECTLY UPDATED

CROSS-REFERENCE TO RELATED APPLICATIONS

The present invention contains subject matter related to, and claims priority from, Japanese Patent Application No. JP 2006-355322 filed in the Japanese Patent Office on Dec. 28, 2006, the entire contents of which are incorporated herein by reference.

BACKGROUND OF THE INVENTION

1. Field of the Invention

The present invention relates to information processing apparatuses and methods, programs, and recording media, and more particularly, to an information processing apparatus and method, a program, and a recording medium that effectively utilize a memory protection function of an operating system (OS) and improve user operability.

2. Description of the Related Art

Computer OSs provide a function of managing various resources, such as a register set used by an application program, main memory images, and files, as well as hardware devices, such as memories and disks, and allowing the application program to utilize the various resources.

In particular, recently available OSs have a developed memory protection function of monitoring whether writing of data to a main memory has been correctly performed and preventing an operation failure of the computer caused by writing of data to an incorrect area of the main memory.

For example, in a case where data has been written to an incorrect area of a main memory in an application program, a function of the OS kills (forcibly terminates) the process of the application program.

In addition, a single processor system for performing multiple job processing using a memory protection function of the OS has been suggested in which exclusive control is performed efficiently and safely at a user-process level without issuing a dedicated instruction (for example, see Japanese Unexamined Patent Application Publication No. 2002-157132).

SUMMARY OF THE INVENTION

However, many consumer electronics (CE) apparatuses, such as cellular phones or digital cameras, receive user instructions for start-up and termination of the apparatus through an application program.

Thus, in a case where a process of the application program is killed in accordance with a function of the OS of the CE apparatus, a user may have to perform an operation, such as turning off the power of the apparatus, in order to handle a failure of the apparatus.

It is desirable to effectively utilize a memory protection function of an OS and to improve user operability.

An information processing apparatus according to an embodiment of the present invention includes determination means for determining whether incorrect updating processing in which information stored in a memory of the information processing apparatus is incorrectly updated has been executed in a first application program for receiving an instruction issued by a user and for controlling execution of processing corresponding to the instruction; forcible termination means for, when the determination means determines that the incorrect updating processing has been executed, forcibly terminating the first application program; and restart control means for, when the determination means determines that the incorrect updating processing has been executed, after the forcible termination means terminates the first application program, notifying the user of the occurrence of the incorrect updating processing and controlling execution of a second application program for receiving an instruction relating to restart of the information processing apparatus.

The determination means may further determine whether incorrect updating processing has been executed in the second application program. When the determination means determines that the incorrect updating processing has been executed in the second application program, the restart control means may control execution of processing for restarting the information processing apparatus, irrespective of whether the instruction relating to the restart of the information processing apparatus has been issued by the user.

The information processing apparatus may further include a display screen for displaying an image. A message for notifying the user of the occurrence of the incorrect updating processing and a graphical user interface for receiving the instruction relating to the restart of the information processing apparatus may be displayed on the display screen in the second application program.

An operating system having a memory protection function may be implemented. Processing of the determination means and processing of the forcible termination means may each be executed as the memory protection function of the operating system.

The processing of the restart control means may be executed in a program hooked into the operating system.

An information processing method according to another embodiment of the present invention includes the steps of determining whether incorrect updating processing in which information stored in a memory of an information processing apparatus is incorrectly updated has been executed in a first application program for receiving an instruction issued by a user and for controlling execution of processing corresponding to the instruction; forcibly terminating, when it is determined that the incorrect updating processing has been executed, the first application program; and notifying, when it is determined that the incorrect updating processing has been executed, after the first application program is terminated, the user of the occurrence of the incorrect updating processing and controlling execution of a second application program for receiving an instruction relating to restart of the information processing apparatus.

A computer-readable program according to another embodiment of the present invention includes the steps of performing control such that it is determined whether incorrect updating processing in which information stored in a memory of an information processing apparatus is incorrectly updated has been executed in a first application program for receiving an instruction issued by a user and for controlling execution of processing corresponding to the instruction; performing control such that, when it is determined that the incorrect updating processing has been executed, the first application program is forcibly terminated; and performing control such that, when it is determined that the incorrect updating processing has been executed, after the first application program is terminated, the user is notified of the occurrence of the incorrect updating processing and execution of a second application program for receiving an instruction relating to restart of the information processing apparatus is controlled.

According to another embodiment of the present invention, it is determined whether incorrect updating processing in which information stored in a memory of an information processing apparatus is incorrectly updated has been executed in a first application program for receiving an instruction issued by a user and for controlling execution of processing corresponding to the instruction. When it is determined that the incorrect updating processing has been executed, the first application program is forcibly terminated. When it is determined that the incorrect updating processing has been executed, after the first application program is terminated, the user is notified of the occurrence of the incorrect updating processing and execution of a second application program for receiving an instruction relating to restart of the information processing apparatus is controlled.

Accordingly, a memory protection function of an OS can be effectively utilized, and user operability can be improved.

DESCRIPTION OF THE PREFERRED EMBODIMENTS

Figure 1:
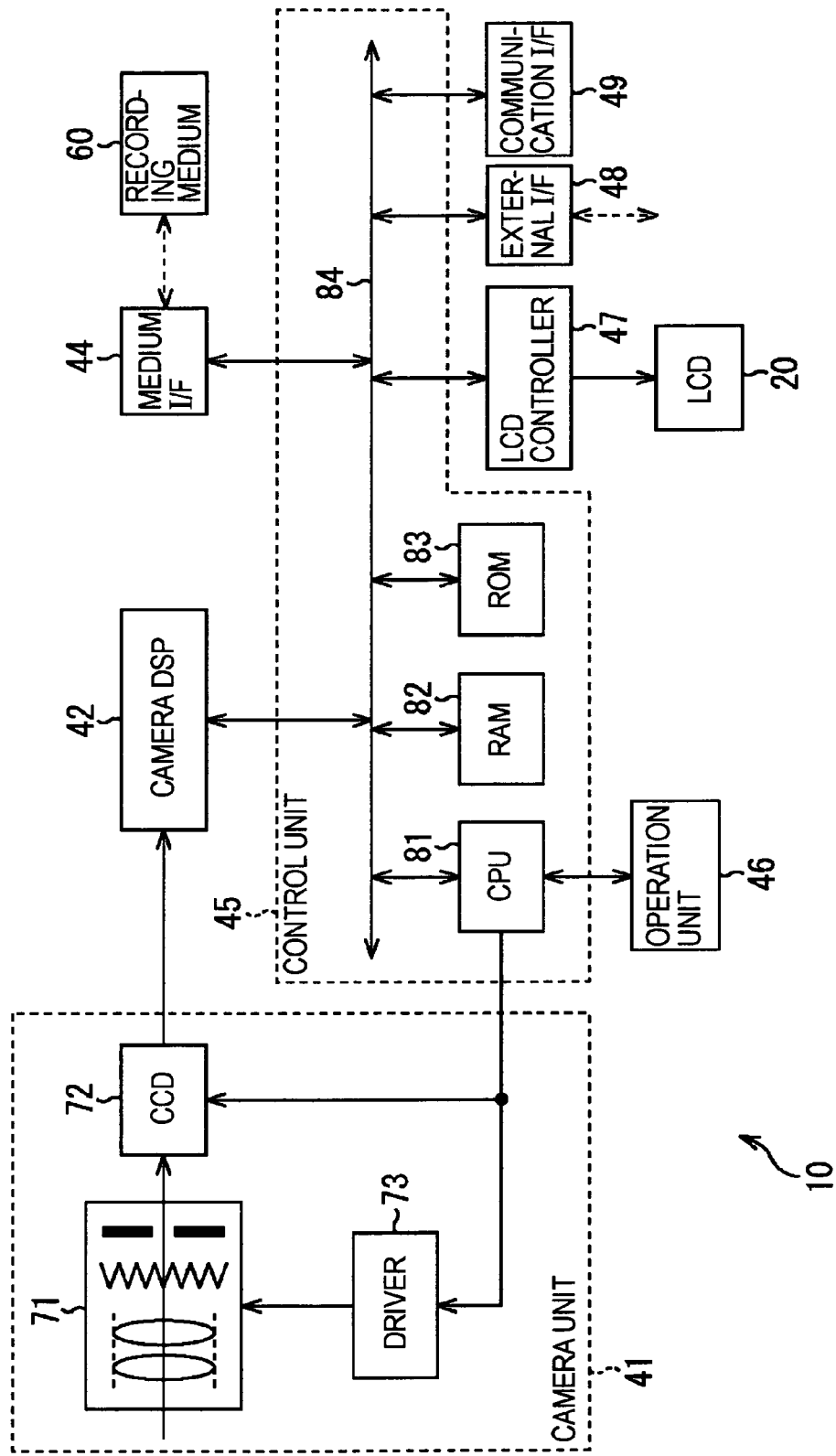
FIG. 1 is a block diagram showing an example of the configuration of a CE apparatus according to an embodiment of the present invention.

Before describing preferred embodiments of the present invention, the correspondence between the features of the present invention and embodiments described in the description of the preferred embodiments or the drawings will be discussed below. This description is intended to assure that embodiments supporting the invention are described in the description of the preferred embodiments or the drawings. Thus, even if an embodiment described in the description of the preferred embodiments or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

An information processing apparatus according to an embodiment of the present invention includes determination means (for example, a kernel of an OS 101 shown in FIG. 2 for executing processing of step S101 shown in FIG. 4) for determining whether incorrect updating processing in which information stored in a memory of the information processing apparatus is incorrectly updated has been executed in a first application program for receiving an instruction issued by a user and for controlling execution of processing corresponding to the instruction; forcible termination means (for example, the kernel of the OS 101 shown in FIG. 2 for executing processing of step S103 shown in FIG. 4) for, when the determination means determines that the incorrect updating processing has been executed, forcibly terminating the first application program; and restart control means (for example, an exception handler 133 shown in FIG. 3) for, when the determination means determines that the incorrect updating processing has been executed, after the forcible termination means terminates the first application program, notifying the user of the occurrence of the incorrect updating processing and controlling execution of a second application program for receiving an instruction relating to restart of the information processing apparatus.

An information processing method according to another embodiment of the present invention includes the steps of determining (for example, the processing of step S101 shown in FIG. 4) whether incorrect updating processing in which information stored in a memory of an information processing apparatus is incorrectly updated has been executed in a first application program for receiving an instruction issued by a user and for controlling execution of processing corresponding to the instruction; forcibly terminating (for example, the processing of step S103 shown in FIG. 4), when it is determined that the incorrect updating processing has been executed, the first application program; and notifying (for example, processing of steps S121 to S125 shown in FIG. 5), when it is determined that the incorrect updating processing has been executed, after the first application program is terminated, the user of the occurrence of the incorrect updating processing and controlling execution of a second application program for receiving an instruction relating to restart of the information processing apparatus.

Embodiments of the present invention will be described with reference to the drawings.

FIG. 1 is a block diagram showing an example of the configuration of a CE apparatus according to an embodiment of the present invention. A CE apparatus 10 shown in FIG. 1 is, for example, a digital camera.

The CE apparatus 10 according to this embodiment mainly includes a camera unit 41, a camera digital-signal processor (DSP) 42, a medium interface (hereinafter, referred to as a medium I/F) 44, a control unit 45, an operation unit 46, a liquid crystal display (LCD) controller 47, an LCD 20, an external interface (hereinafter, referred to as an external I/F) 48, and a communication interface (hereinafter, referred to as a communication I/F) 49. In addition, a removable recording medium 60 is provided in the CE apparatus 10.

The recording medium 60 is, for example, a so-called memory card using a semiconductor memory, an optical recording medium, such as a recordable digital versatile disc (DVD) or a recordable compact disc (CD), or a magnetic disk.

The camera unit 41 includes, for example, an optical block 71 including a lens, a focus mechanism, a shutter mechanism, a diaphragm (iris) mechanism, and the like, a charge-coupled device (CCD) 72, and a driver 73 for controlling driving of the optical block 71. Instead of the CCD 72, a photoelectric conversion device, such as a complementary metal-oxide semiconductor (CMOS) sensor, may be used.

For example, when a user operates the operation unit 46, the camera unit 41 captures an image. Image data of the captured image is recorded into the recording medium 60 through the control unit 45 and the medium I/F 44. The operation unit 46 includes, for example, a touch panel, a control key, and the like. The operation unit 46 includes various operation buttons.

In accordance with an instruction entered by the user using the operation unit 46, the image data recorded in the recording medium 60 is read from the recording medium 60 through the medium I/F 44 and is supplied to the camera DSP 42.

The camera DSP 42 decodes the encoded image data that has been read from the recording medium 60 and that has been supplied through the medium I/F 44, and supplies the decoded image data to the LCD controller 47 through a system bus 84. The LCD controller 47 forms an image signal from the supplied image data, and supplies the formed image signal to the LCD 20. Accordingly, an image corresponding to the image data recorded in the recording medium 60 is displayed on the display screen of the LCD 20.

On the display screen of the LCD 20, a graphical user interface (GUI) image generated by the control unit 45 and the like can be displayed.

The control unit 45 includes a central processing unit (CPU) 81, a random-access memory (RAM) 82, and a read-only memory (ROM) 83 that are connected to each other via the system bus 84. The control unit 45 is, for example, a general-purpose embedded microcomputer or a dedicated system large-scale integrated circuit (LSI). The control unit 45 is capable of controlling each unit of the CE apparatus 10.

The RAM 82 is mainly used as a work area for temporarily storing intermediate result of processing. The ROM 83 stores various programs to be executed by the CPU 81 or data necessary for processing.

That is, when the CPU 81 executes a program loaded from the ROM 83 to the RAM 82, the control unit 45 outputs a control signal to each of the camera unit 41 and the camera DSP 42. Accordingly, various types of processing of the CE apparatus 10, such as capturing of an image, displaying of a captured image, and the like, can be performed in accordance with a user instruction entered using the operation unit 46.

The CE apparatus 10 may be connected, for example, to an external personal computer through the external I/F 48. In this case, the CE apparatus 10 is capable of recording into the recording medium 60 image data received from the external personal computer or supplying to the external personal computer image data recorded in the recording medium 60.

The communication I/F 49 of the CE apparatus 10 is, for example, a network interface card (NIC) or the like. The communication I/F 49 can be connected to a network so as to transmit and receive various data through the network.

Figure 2:
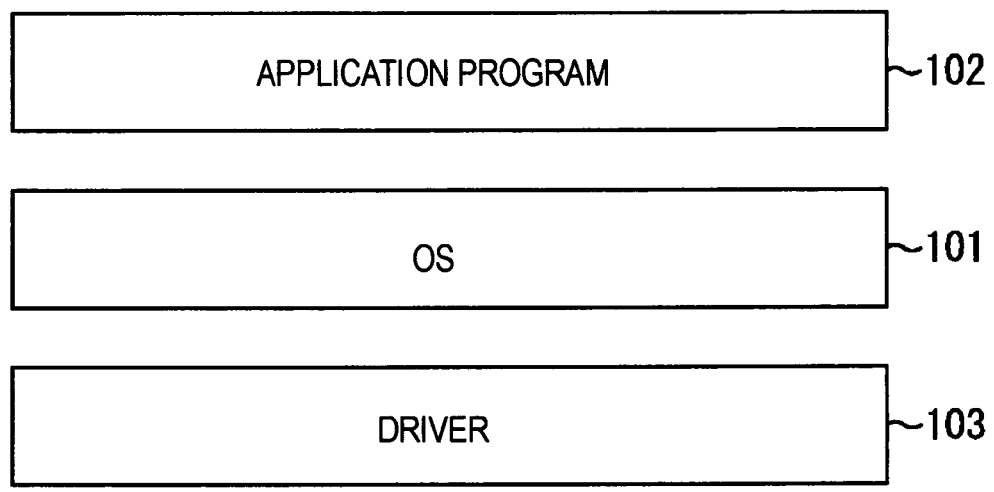
FIG. 2 is a block diagram showing an example of the functional configuration of software executed by a CPU shown in FIG. 1.

FIG. 2 is a block diagram showing an example of the functional configuration of software executed by the CPU 81. As shown in FIG. 2, software to be executed by the CPU 81 includes an OS 101, an application program 102, and a driver 103.

In FIG. 2, the OS 101 has a function of managing various resources, such as hardware devices including the RAM 82 and the recording medium 60, a register set used by the application program 102, and main memory images and files formed by data stored in the RAM 82 and allowing the application program 102 to use the various sources. The OS 101 is capable of detecting a system error occurring when software installed in the CE apparatus 10 is not properly executed.

The OS 101 has a memory protection function. For example, the memory protection function monitors whether writing of data to the RAM 82 has been performed correctly. If writing of data to the RAM 82 has been performed incorrectly, the memory protection function detects the occurrence of a system error and prevents an operation failure of the CE apparatus 10 caused by incorrect writing processing, such as writing of data to an incorrect area of the RAM 82. The OS 101 is, for example, basic software, such as Linux (registered trademark).

The application program 102 is software, such as a program to be executed on the OS 101. The application program 102 is, for example, a program for controlling execution of processing, such as capturing of an image by the camera unit 41 or displaying of an image on the LCD 20.

The driver 103 is, for example, software corresponding to a device driver, such as the driver 73 or the medium I/F 44, for controlling an operation of hardware of each unit of the CE apparatus 10. The driver 103 may be a part of the OS 101.

Figure 3:
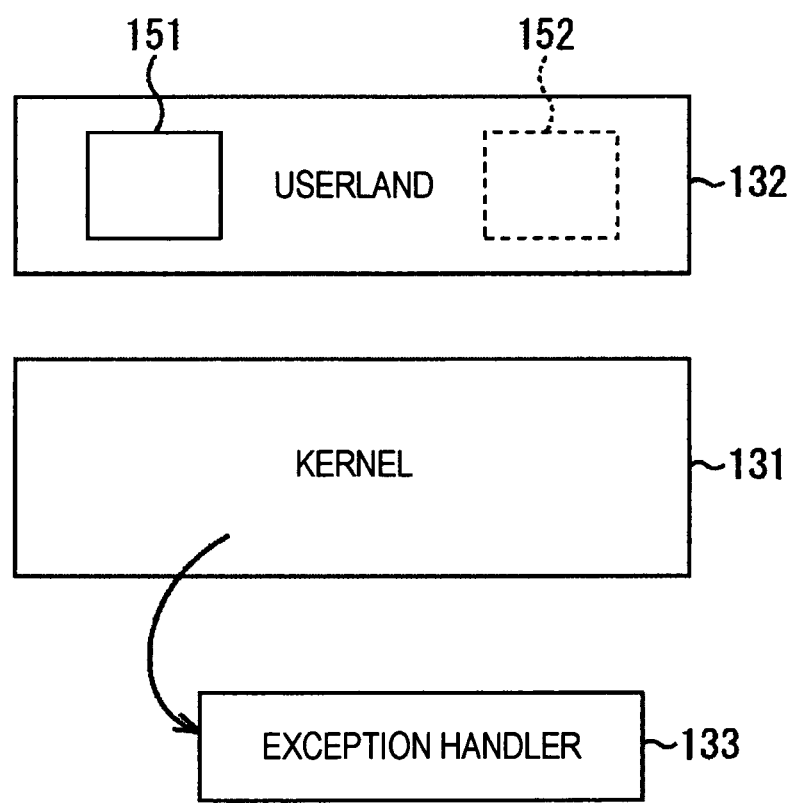
FIG. 3 is an explanatory illustration showing the configuration of a storage area controlled by an OS when the software shown in FIG. 2 is executed.

FIG. 3 is an explanatory illustration showing the configuration of a storage area (or a virtual storage area) of the RAM 82 controlled by the OS 101 when the software shown in FIG. 2 is executed.

As shown in FIG. 3, the OS 101 controls the storage area (or the virtual storage area) of the RAM 82 that is divided into a kernel space 131 and a userland space 132.

The kernel space 131 mainly stores data necessary for execution of a process corresponding to software called a "kernel", which is a core portion of the OS 101. The userland space 132 mainly stores data necessary for execution of software forming the application program 102.

For example, in a case where a program forming the application program 102 is executed, a storage area of a process 151 corresponding to the program is allocated in the userland space 132 by the kernel of the OS 101 that is being executed in the kernel space 131.

That is, software (a program or the like) forming the OS 101 is executed in the kernel space 131, and software (a program or the like) forming the application program 102 is executed in the userland space 132.

In the CE apparatus 10, electric power supply to the camera unit 41, the camera DSP 42, the LCD 20, and the like is interrupted in accordance with, for example, a user instruction using the operation unit 46, a period of time measured by a timer (not shown) contained in the control unit 45, and the like. For example, in a case where a power ON/OFF button of the operation unit 46 is pressed or in a case where no instruction has been entered in the operation unit 46 for more than a predetermined period of time, the CE apparatus 10 interrupts electric power supply to the camera unit 41, the camera DSP 42, the LCD 20, and the like in order to reduce power consumption.

However, as described above, even in a state in which electric power supply to the camera unit 41, the camera DSP 42, the LCD 20, and the like is interrupted, electric power is supplied to the RAM 82 so that data stored in the RAM 82 can be used again. Thus, for example, in a case where the user presses again the power ON/OFF button of the operation unit 46, electric power supply to the camera unit 41, the camera DSP 42, the LCD 20, and the like is resumed in a state where loading of a program from the ROM 83 to the RAM 82 is completed, that is, in a state where software forming the OS 101 is executed in the kernel space 131 and software forming the application program 102 is executed in the userland space 132. Thus, the CE apparatus 10 is capable of capturing an image or the like immediately after the power ON/OFF button is pressed. Accordingly, the CE apparatus 10 achieves high operability for users.

Such a configuration of the CE apparatus 10 implements, for example, a function that is similar to a so-called suspend/resume function, which is a function that has been often provided in notebook-sized personal computers and that temporarily stores a state present immediately before the computer is turned off so that an operation can be immediately resumed when the computer is restarted next time.

However, if the suspend/resume function is repeatedly performed, data stored in a memory, such as a RAM, may be incorrectly updated or destroyed. Thus, an operation failure of an apparatus may occur. In such a case, a personal computer of the related art restarts the personal computer after shutdown or reboot and loads a program again to a memory, such as a RAM. Accordingly, the personal computer is capable of continuing processing.

Normally, however, a CE apparatus, such as a digital camera, does not perform shutdown or reboot, except for, for example, a case where a buttery of the CE apparatus is removed or a case where updating of firmware is performed.

In CE apparatuses, such as digital cameras, processing of a program forming the application program 102 includes only processing, such as capturing of images, displaying of images, and the like. Thus, normally, a plurality of programs of the application program 102 are not executed at the same time on the OS 101. For example, it is unlikely that data is incorrectly updated due to the use of data stored in a memory, such as a RAM, by a plurality of programs at the same time. In addition, electric power supplied to the RAM so that data can be stored into the RAM is very weak. Thus, in a case where CE apparatuses, such as digital cameras, repeatedly perform the suspend/resume function, user operability can be improved compared with a case where shutdown or reboot is performed at every startup or termination.

However, even when CE apparatuses repeatedly perform the suspend/resume function, data stored in a memory, such as a RAM, may be incorrectly updated or destroyed. Thus, an operation failure of the apparatus may occur.

For example, in a program corresponding to the process 151, if there is an error (bug) in the description of processing, such as reservation or release of a memory size, and data exceeding the reserved memory size is entered, the data may be written to an incorrect area of the RAM 82. In this case, the CE apparatus 10 may operate improperly. Thus, the kernel of the OS 101 that is being executed in the kernel space 131 monitors whether writing of data to the RAM 82 has been properly performed. If writing of data to the RAM 82 has not been performed properly (that is, if writing of data to the RAM 82 has been performed incorrectly), allocation of a storage area for the process 151 is released. Accordingly, the program corresponding to the process 151 is forcibly terminated.

Not only improper processing caused by a bug of a program or the like but incorrect memory updating in a program of the application program 102 is also regarded as a system error that should be assumed by vendors of the CE apparatus 10. Thus, it is necessary for vendors of the CE apparatus 10 to design the CE apparatus 10 such that a state where the CE apparatus 10 is not usable does not happen even when such a system error occurs. Thus, in general, CE apparatuses available in recent years include an operating system having a memory protection function, such as the OS 101.

CE apparatuses may be able to receive instructions for starting and terminating the apparatuses, as well as instructions for capturing and displaying images, through an application program. For example, an instruction for starting or terminating a CE apparatus may be issued by a user instruction using the operation unit in accordance with a GUI image displayed on the LCD. The storage capacity of a ROM or the like storing software in a compact CE apparatus, such as a digital camera, is small and it is desirable that the operation unit has a simple configuration. Thus, a function of controlling a GUI for receiving a user instruction is often contained in a single application program.

Thus, in a CE apparatus of the related art, when the application program 102 is forcibly terminated in accordance with the memory protection function of the OS 101, a user feels as if the CE apparatus became inoperable. In such a case, it is necessary for the user to restart the OS 101 of the CE apparatus. For example, this causes the user to perform an operation for removing a battery (not shown) of the CE apparatus and installing the battery again.

Alternatively, in a CE apparatus of the related art, if the application program 102 is forcibly terminated in accordance with the function of the OS 101, part of the kernel of the OS 101 may be changed so that the OS 101 of the CE apparatus can be automatically executed again. However, in a case where the OS 101 is loaded to the RAM again and the CE apparatus is restarted, a long time is necessary for various type of processing involved in the restart. Thus, an instruction entered through the operation unit is not acceptable for a predetermined period of time. In this case, a user feels as if the CE apparatus suddenly became inoperable. Thus, the user finds that the operability of the CE apparatus is very low.

Accordingly, according to an embodiment of the present invention, in a case where an application program that is ordinarily executed is forcibly terminated in accordance with a function of the OS 101, the user is notified of the occurrence a system error of the CE apparatus 10 and a new application program for urging the user to restart the CE apparatus 10 is executed.

More specifically, as software that is to be executed in the kernel space 131 and is hooked into the kernel of the OS 101, an exception handler 133 is provided. If the kernel of the OS 101 detects that writing of data to the RAM 82 has been performed incorrectly, the kernel of the OS 101 notifies the exception handler 133 that writing of data to the RAM 82 has been performed incorrectly and then forcibly terminates a program corresponding to the process 151.

The exception handler 133 is stored in advance, for example, in the ROM 83 or the like as a program added to the OS 101. That is, actually, the exception handler 133 is one of programs that are loaded to the RAM 82 and are executed in the kernel space 131.

If the exception handler 133 is notified by the kernel of the OS 101 that writing of data to the RAM 82 has been performed incorrectly, after the program corresponding to the process 151 is terminated, the exception handler 133 controls execution of an application program, which is a program different from the terminated program and which notifies the user of the occurrence of a system error in the CE apparatus 10 and urges the user to restart the CE apparatus 10.

In the CE apparatus 10, an application program that is ordinarily executed may be hereinafter referred to as an "ordinary application". In addition, an application program for notifying the user of the occurrence of a system error in the CE apparatus 10 and urging the user to restart the CE apparatus 10 may be hereinafter referred to as an "exception application". The ordinary application and the exception application are each stored in advance in the ROM 83 or the like as a program forming the application program 102. The exception application is executed only under the control of the exception handler 133. When electric power is supplied to the CE apparatus 10 and the CE apparatus 10 is started, the ordinary application is automatically executed.

When the exception handler 133 controls the execution of the exception application, the kernel of the OS 101 allocates a storage area for a process 152 corresponding to the exception application in the userland space 132. When the CPU 81 of the CE apparatus 10 executes the exception application and, for example, a predetermined message or GUI is displayed on the LCD 20, the user is notified of the occurrence of a system error in the CE apparatus 10 and the user is urged to restart the CE apparatus 10.

An example of a process for handling abnormal termination by the kernel of the OS 101 will be described with reference to a flowchart shown in FIG. 4. The kernel of the OS 101 performs this process when the CE apparatus 10 is started and software, such as the OS 101 and the application program 102, is loaded in the RAM 82. In this example, as programs forming the application program 102, an ordinary application and an exception application are provided in the CE apparatus 10.

In step S101, the kernel of the OS 101 determines whether incorrect processing has been performed (that is, a system error has occurred) in the ordinary application that is being executed in the userland space 132. The processing of step S101 is repeated until the kernel of the OS 101 determines that incorrect processing has been performed.

For example, in a case where there is an error in the description of processing, such as reservation or release of a memory size, and data exceeding the reserved memory size is entered, the data is written to an incorrect area of the RAM 82. Thus, it is determined in step S101 that incorrect processing has been performed, and the process proceeds to step S102.

In step S102, the kernel of the OS 101 notifies the exception handler 133 that the incorrect processing has been performed in the ordinary application. Here, for example, in the processing of the kernel of the OS 101, an interruption occurs. A program (code) corresponding to the exception handler 133 is fetched and processing of the exception handler 133 is executed. In addition, a parameter and the like containing information for identifying the incorrect processing detected by the kernel of the OS 101 are delivered to the exception handler 133. Accordingly, the exception handler 133 is notified that the incorrect processing has been performed in the ordinary application.

In step S103, the kernel of the OS 101 forcibly terminates (kills) the process corresponding to the ordinary application that is being executed in the userland space 132.

In step S104, the kernel of the OS 101 determines whether a request for reboot or shutdown has been received from the exception application or the exception handler 133. If the kernel of the OS 101 determines that a request for reboot or shutdown has not been received, the process returns to step S101. Then, the subsequent processing is repeatedly performed.

If the kernel of the OS 101 determines in step S104 that a request for reboot or shutdown has been received from the exception application or the exception handler 133, the process proceeds to step S105.

In step S105, the kernel of the OS 101 performs reboot or shutdown. Thus, when the CE apparatus 10 is started next time, software, such as the OS 101 and the application program 102, is loaded again to the RAM 82.

When reboot is performed in the processing of step S105, the CE apparatus 10 is automatically restarted and software, such as the OS 101 and the application program 102, is loaded to the RAM 82 again. When shutdown is executed in the processing of step S105, electric power supply to the entire CE apparatus 10 including the RAM 82 is interrupted. Then, for example, when the power ON/OFF button of the operation unit 46 is pressed, the OS 101 is restarted and software, such as the OS 101 and the application program 102, is loaded to the RAM 82 again.

Figure 5:
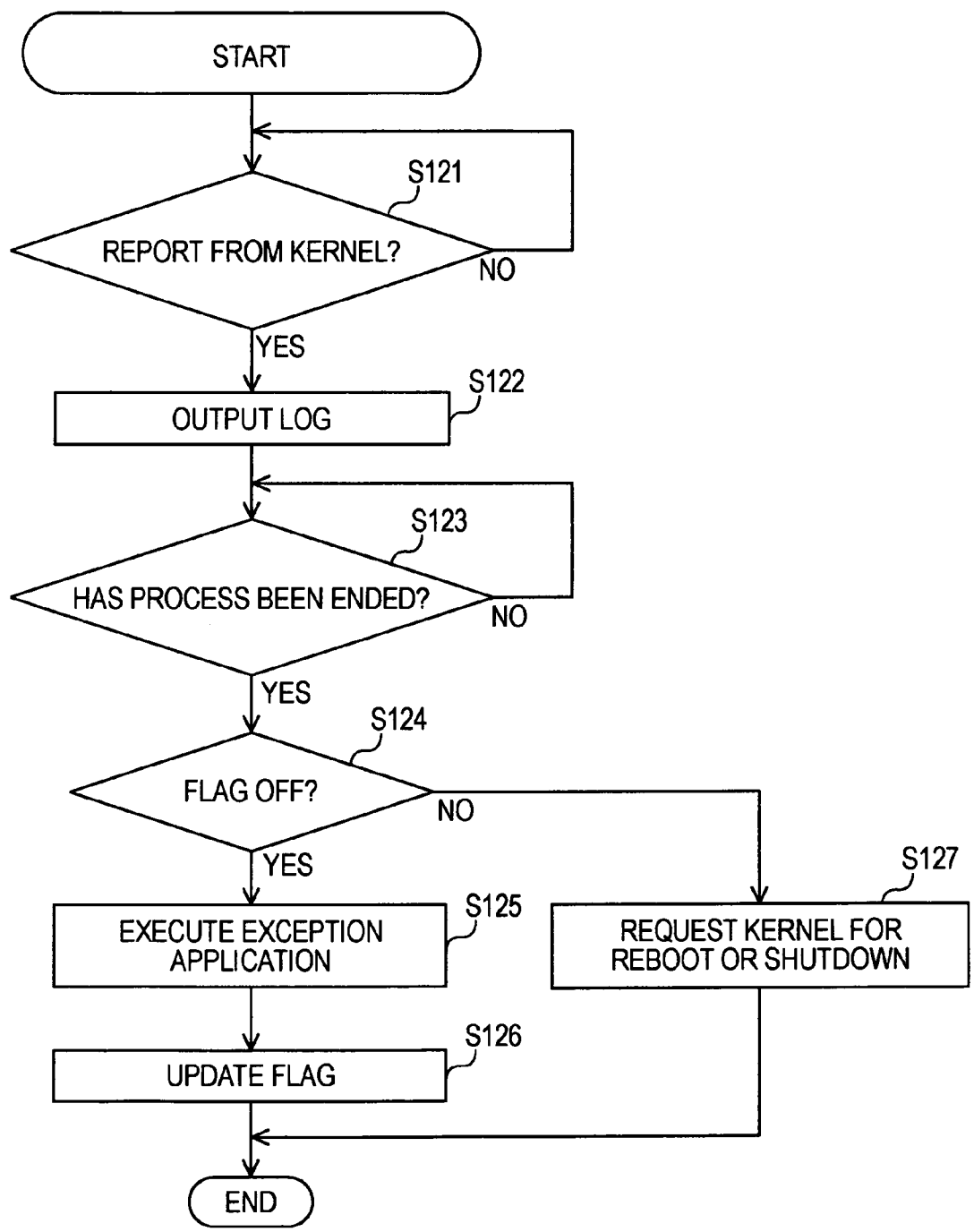
FIG. 5 is a flowchart of an example of a process of an exception handler.

An example of a process of the exception hander will be described with reference to a flowchart shown in FIG. 5.

In step S121, the exception handler 133 determines whether execution of incorrect processing in the ordinary application has been notified by the kernel of the OS 101. The processing of step S121 is repeated until execution of incorrect processing in the ordinary application has been notified. In this processing, it is determined whether the notification in the processing of step S102 shown in FIG. 4 has been received.

If it is determined in step S121 that execution of incorrect processing in the ordinary application has been notified by the kernel of the OS 101, the process proceeds to step S122. In step S122, the exception handler 133 outputs a log. In this processing, for example, information identifying a program corresponding to the incorrect processing, time at which the incorrect processing was performed, and the like, is outputs as a log.

Figure 4:
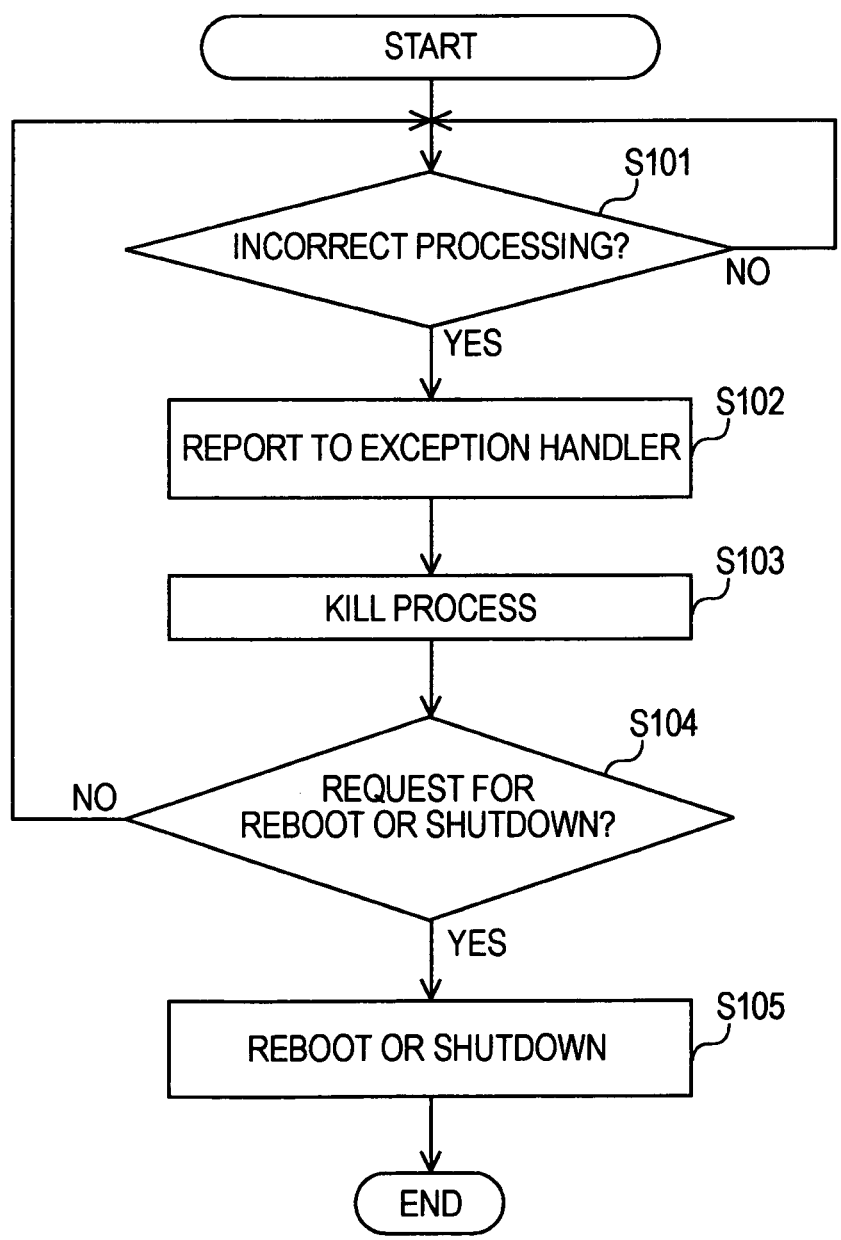
FIG. 4 is a flowchart of an example of a process for handing abnormal termination.

In step S123, the exception handler 133 waits until the process (for example, the process 151 shown in FIG. 3) corresponding to the ordinary application killed in the processing of step S103 shown in FIG. 4 is completely terminated.

If it is determined in step S123 that the process corresponding to the ordinary application is completely terminated, the process proceeds to step S124. In step S124, the exception handler 133 determines whether a flag indicates "OFF". This flag is provided for determining whether the exception handler 133 is to start (execute) the exception application. The flag indicates "ON" or "OFF". As an initial value, "OFF" is set.

In this case, since the flag indicates the initial value "OFF", it is determined in step S124 that the flag indicates "OFF". Then, the process proceeds to step S125.

In step S125, the exception handler 133 controls execution of the exception application. Thus, a process (for example, the process 152 shown in FIG. 3) corresponding to the exception application is executed in the userland space 132.

Figure 6:
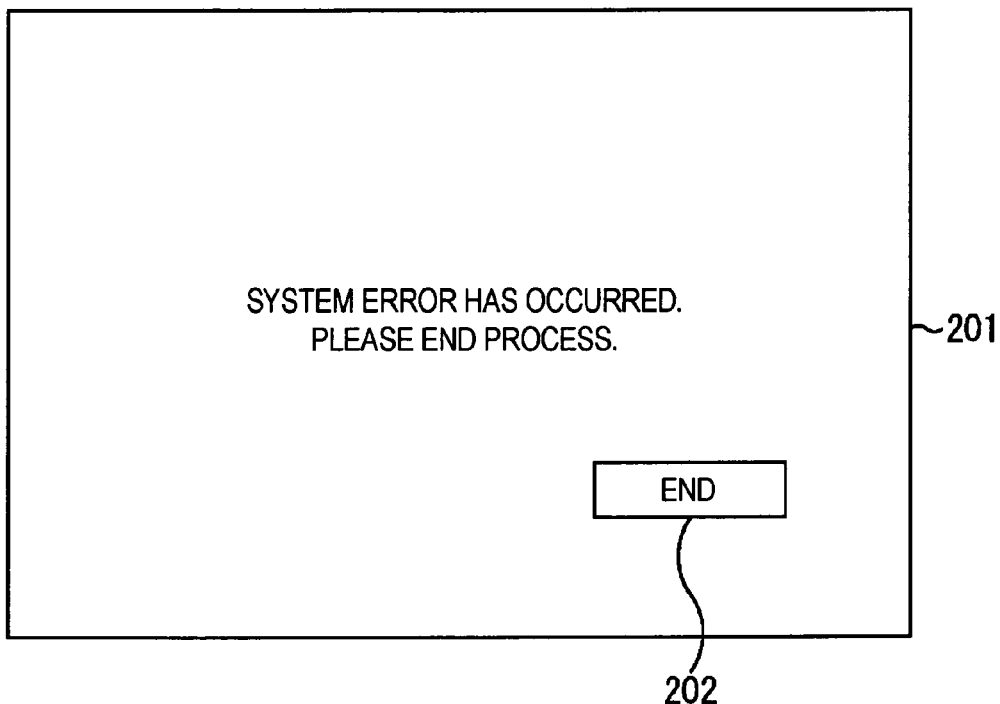
FIG. 6 is an illustration of an example of a screen displayed by an exception application.

When the exception application is executed, for example, a screen shown in FIG. 6 is displayed on the LCD 20.

FIG. 6 shows an example of a screen displayed in accordance with the exception application. In this example, a message "System error has occurred. Please end process." is displayed on a screen 201. Accordingly, the user is able to recognize that a system error has occurred in the CE apparatus 10.

The screen 201 also has a function as a GUI. A button 202 is displayed on the screen 201. For example, when the user superimposes a cursor on the button 202 of the screen 201 and presses (or clicks) the button 202 using the operation unit 46, an instruction to shut down or reboot the CE apparatus 10 can be issued.

That is, the exception application is an application program for displaying a message notifying the user of the occurrence of a system error in the CE apparatus 10 and for displaying the screen 201 urging the user to press the button 202 to restart the CE apparatus 10.

Referring back to FIG. 5, after the processing of step S125, the exception handler 133 updates the flag in step S126. In this case, the value of the flag is changed from the initial value "OFF" to "ON".

Figure 7:
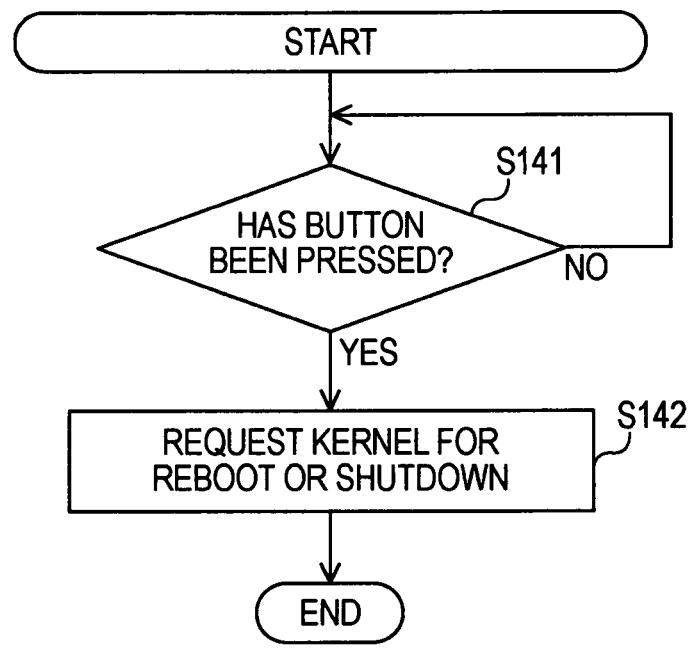
FIG. 7 is a flowchart of an example of a process of the exception application.

An example of a process of the exception application will be described with reference to a flowchart shown in FIG. 7.

In step S141, the exception application determines whether a button for instructing execution of processing relating to restart, such as the button 202 shown in FIG. 6, has been pressed (or clicked). The processing of step S141 is repeated until it is determined that the button has been pressed. If it is determined in step S141 that the button for instructing the execution of the processing relating to restart has been pressed, the process proceeds to step S142.

In step S142, the exception application requests the kernel of the OS 101 to reboot or shut down the CE apparatus 10. Thus, in the processing of step S105 shown in FIG. 4, reboot or shutdown is executed. After the execution of reboot or shutdown, when the CE apparatus 10 is restarted, the ordinary application is automatically executed.

Accordingly, even when incorrect processing is executed in a program forming the application program 102 and the program is forcibly terminated in accordance with a function of the OS 101, the occurrence of a system error in the CE apparatus 10 can be notified to the user. Thus, the memory protection function of the OS 101 can be effectively utilized, and user operability can be improved.

As described above, the exception application is a simple program for displaying the screen 201 and requesting the kernel of the OS 101 to execute reboot. However, the exception application may have a bug. In the exception application, data exceeding a reserved memory size may be entered. In this case, the kernel of the OS 101 detects incorrect processing in the exception application, and the exception application is forcibly terminated.

However, in this case, similarly to the case where the ordinary application is forcibly terminated, even if the exception application is executed again, incorrect processing may be repeated in the exception application. Thus, according to an embodiment of the present invention, in a case where the kernel of the OS 101 detects incorrect processing in the exception application and forcibly terminates the exception application, the CE apparatus 10 is rebooted or shut down and then is restarted.

That is, in a case where incorrect processing is executed when the exception application is activated, it is determined in step S101 that incorrect processing has been performed. Then, the process proceeds to steps S102 and S103. In this case, in step S103, the process 152 corresponding to the exception application that is being executed in the userland space 132 is killed.

In addition, in the processing of step S102, the kernel of the OS 101 notifies the exception handler 133 that incorrect processing in the exception application has been performed. In accordance with this, the processing of steps S122 to S124 shown in FIG. 5 is executed. In this case, since the flag indicates "ON", after the processing of step S124, the process proceeds to step S127.

In step S127, the exception handler 133 requests the kernel of the OS 101 to reboot or shut down the CE apparatus 10. Then, the processing of steps S104 and S105 shown in FIG. 4 is executed.

In this case, in step S104 shown in FIG. 4, it is determined that a request for reboot or shutdown has been issued. Then, in step S105, the kernel of the OS 101 reboots or shuts down the CE apparatus 10. Thus, the CE apparatus 10 is rebooted or shut down and then is restarted, and software, such as the OS 101 and the application program 102, is loaded to the RAM 82 again. At the restart, the ordinary application is automatically executed.

In the above description, as an example of a system error to be detected by the OS 101, a case where incorrect processing in which data exceeding a memory size reserved by a program is entered and the data is written to an incorrect area of the RAM 82 is performed has been provided. However, for example, the OS 101 may detect the occurrence of a system error, such as the occurrence of a so-called "out of memory" state in which all the usable storage area of the RAM 82 is occupied by a program of the application program 102 or the occurrence of another type of incorrect processing in which software is not properly operable.

Figure 8:
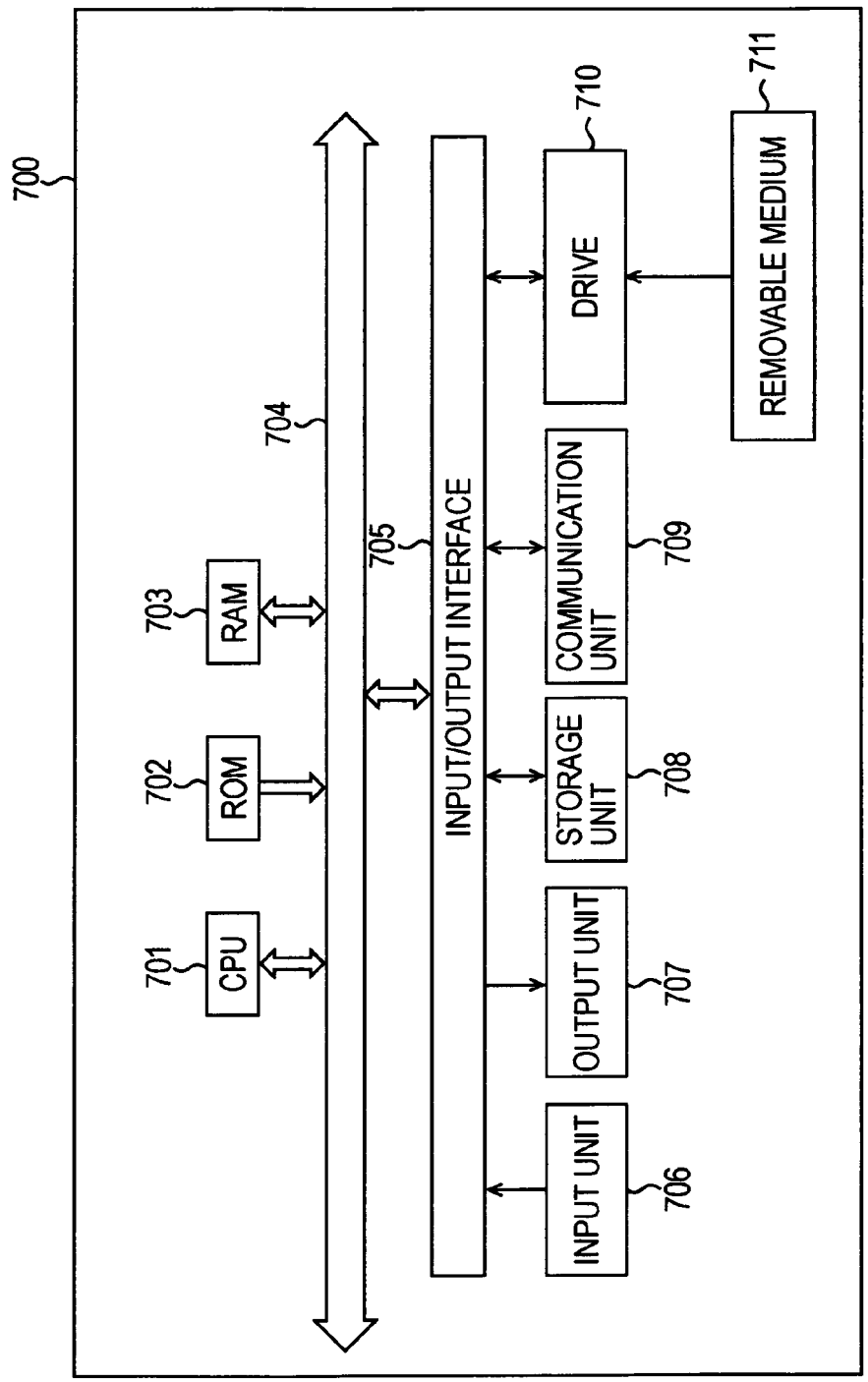
FIG. 8 is a block diagram showing an example of the configuration of a personal computer.

Although an example in which an embodiment of the present invention is applied to the CE apparatus 10 has been described, an embodiment of the present invention may also be applied to a personal computer shown in FIG. 8. FIG. 8 is a block diagram showing an example of the configuration of a personal computer 700.

Referring to FIG. 8, a CPU 701 performs various types of processing in accordance with a program stored in a ROM 702 or a program loaded from a storage unit 708 to a RAM 703. Data necessary for various types of processing to be performed by the CPU 701 is also stored in the RAM 703.

The CPU 701, the ROM 702, and the RAM 703 are connected to each other via a bus 704. An input/output interface 705 is connected to the bus 704.

An input unit 706 including a keyboard, a mouse, and the like, an output unit 707 including a display, such as a cathode-ray tube (CRT) or an LCD, a speaker, and the like, the storage unit 708 including a hard disk, and a communication unit 709 including a modem, a network interface, such as a local-area network (LAN) card, and the like are connected to the input/output interface 705. The communication unit 709 performs communication processing via a network including the Internet.

A drive 710 is connected, when necessary, to the input/output interface 705. A removable medium 711, such as a magnetic disk, an optical disk, a magneto-optical disk, or a semiconductor memory, is installed in the drive 710 when necessary. A computer program read from the removable medium 711 is installed into the storage unit 708 when necessary.

The above-described series of processing can be performed by hardware or software. In a case where the above-described series of processing is performed by software, a program forming the software is installed via a network, such as the Internet, or from the recording medium 60. or a recording medium, such as the removable medium 711, to the CE apparatus 10 shown in FIG. 1 or to the personal computer 700 shown in FIG. 8.

The recording medium not only includes the removable medium 711, such as a magnetic disk (including a floppy disk (registered trademark), an optical disc (including a CD-ROM and a DVD), a magnetic optical disk (Mini-Disk (MD) (registered trademark)), or a semiconductor memory, which records a program and is distributed in order to provide the program to a user independent of the apparatus, but also includes the ROM 83, the ROM 702, and the hard disk included in the storage unit 708, which record a program and are built in the apparatus to be provided to the user.

In this specification, steps performing the above-described series of processing are not necessarily performed in time series in accordance with the written order. The steps may be performed in parallel or independently without being performed in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   determination means for determining whether information stored in a memory of the information processing apparatus is incorrectly updated during execution of a first application program for receiving an instruction issued by a user and for controlling execution of processing corresponding to the instruction;

forcible termination means for, in response to the determination means determining that the incorrect updating has been executed, forcibly terminating the first application program;

restart control means for, in response to the determination means determining that the incorrect updating has been executed and after the forcible termination means terminating the first application program, controlling execution of an exception application program, said exception application program notifying the user of the occurrence of the incorrect updating and receiving an instruction relating to restart of the information processing apparatus;

wherein the restart control means controls the execution of the processing for executing the exception application program in response to determining that a flag has a first value and then sets the flag to a second value;

said determination means determining whether information stored in the memory of the information processing apparatus is incorrectly updated during execution of the exception application program;

said forcible termination means, in response to the determination means determining that the incorrect updating has been executed during execution of the exception application program, forcibly terminating the exception application program; and said restart control means, in response to the determination means determining that the incorrect updating has been executed during execution of the exception application program and the forcible termination means terminating the exception application program, controlling execution of processing for rebooting or shutting down the information processing apparatus, in response to determining that the flag has the second value;

wherein an operating system having a memory protection function is implemented, processing of the determination means and the forcible termination means are each executed by a kernel of the operating system, and the processing of the restart control means is executed in a program hooked into the kernel of the operating system, and in response to the determination means determining that the incorrect updating has been executed, the kernel causes the forcible termination means to terminate the first application program and notifies the restart control means of the occurrence of the incorrect updating so that the restart control means controls the execution of the exception application program to notify the user of the occurrence of the incorrect updating.

2. The information processing apparatus according to claim 1, wherein when the determination means determines that the incorrect updating has been executed in the exception application program, the restart control means controls the execution of processing for rebooting or shutting down the information processing apparatus irrespective of whether the instruction relating to the restart of the information processing apparatus has been issued by the user.

3. The information processing apparatus according to claim 1, further comprising a display screen for displaying an image, wherein a message for notifying the user of the occurrence of the incorrect updating processing and a graphical user interface for receiving the instruction relating to the restart of the information processing apparatus are displayed on the display screen in the exception application program.

4. An information processing method, comprising:
using a processor to carry out the following:
determining whether information stored in a memory of an information processing apparatus is incorrectly updated during execution of a first application program for receiving an instruction issued by a user and for controlling execution of processing corresponding to the instruction, forcibly terminating, in response to determining that the incorrect updating has been executed, the first application program, controlling, in response to determining that the incorrect updating has been executed and after the first type of application program is terminated, execution of an exception application, said exception application notifying the user of the occurrence of the incorrect updating and receiving an instruction relating to restart of the information processing apparatus, wherein the execution of the processing for executing the exception application program is controlled in response to determining that a flag has a first value, and then the flag is set to a second value;

determining whether information stored in the memory of the information processing apparatus is incorrectly updated during execution of the exception application program, and forcibly terminating, in response to determining that the incorrect updating has been executed during execution of the exception application program, the exception application program, and controlling, in response determining that the incorrect updating has been executed during execution of the exception application program and after terminating the exception application program, execution of processing for rebooting or shutting down the information processing apparatus, in response to determining that the flag has the second value;

wherein an operating system having a memory protection function is implemented, the determining whether information stored in the memory of the information processing apparatus is incorrectly updated and the forcibly terminating of the first application program are each executed by a kernel of the operating system, and the controlling execution of the exception application program notifying the user of the occurrence of the incorrect updating is executed in a program hooked into the kernel of the operating system, and in response to the determining that the incorrect updating has been executed, the kernel causes the forcible termination of the first application program and issues a notification so that the execution of the exception application program is carried out and the user is notified of the occurrence of the incorrect updating.

5. A processor encoded with a computer-readable program for carrying out an information processing method, the method comprising:
performing control such that it is determined whether information stored in a memory of an information processing apparatus is incorrectly updated during execution of a first application program for receiving an instruction issued by a user and for controlling execution of processing corresponding to the instruction;

performing control such that, in response to determining that the incorrect updating has been executed, the first application program is forcibly terminated;

performing control such that, in response to determining that the incorrect updating has been executed and after the first application program is terminated, the user is notified of the occurrence of the incorrect updating and execution of a exception application program for receiving an instruction relating to restart of the information processing apparatus is carried out;

wherein the control such that the execution of the processing for executing the exception application program is performed in response to determining that a flag has a first value, and then the flag is set to a second value;

performing control such that it is determined whether information stored in the memory of the information processing apparatus is incorrectly updated during execution of the exception application program;

performing control such that, in response to determining that the incorrect updating has been executed during execution of the exception application program, the exception application program is forcibly terminated; and performing control such that, in response determining that the incorrect updating has been executed during execution of the exception application program and after terminating the exception application program, execution of processing for rebooting or shutting down the information processing apparatus is carried out, in response to determining that the flag has the second value;

wherein an operating system having a memory protection function is implemented, the control such that it is determined whether information stored in the memory of the information processing apparatus is incorrectly updated and the control such that the first application program is forcibly terminated are each executed by a kernel of the operating system, and the control such that the user is notified of the occurrence of the incorrect updating and execution of the exception application program is carried out is executed in a program hooked into the kernel of the operating system, and in response to determining that the incorrect updating has been executed, the kernel causes the forcible termination of the first application program and issues a notification so that the execution of the exception application program is carried out and the user is notified of the occurrence of the incorrect updating.

6. A non-transitory recording medium in which a program for carrying out an information processing method is recorded, the method comprising:

performing control such that it is determined whether information stored in a memory of an information processing apparatus is incorrectly updated during execution of a first application program for receiving an instruction issued by a user and for controlling execution of processing corresponding to the instruction;

performing control such that, in response to determining that the incorrect updating has been executed, the first application program is forcibly terminated;

performing control such that, in response to determining that the incorrect updating has been executed and after the first application program is terminated, execution of an exception application notifying the user of the occurrence of the incorrect updating and receiving an instruction relating to restart of the information processing apparatus is carried out;

wherein the control such that the execution of the processing for executing the exception application program is performed in response to determining that a flag has a first value, and then the flag is set to a second value;

performing control such that it is determined whether information stored in the memory of the information processing apparatus is incorrectly updated during execution of the exception application program;

performing control such that, in response to determining that the incorrect updating has been executed during execution of the exception application program, the exception application program is forcibly terminated; and performing control such that, in response determining that the incorrect updating has been executed during execution of the exception application program and after terminating the exception application program, execution of processing for rebooting or shutting down the information processing apparatus is carried out, in response to determining that the flag has the second value;

wherein an operating system having a memory protection function is implemented, the control such that it is determined whether information stored in the memory of the information processing apparatus is incorrectly updated and the control such that the first application program is forcibly terminated are each executed by a kernel of the operating system, and the control such that the user is notified of the occurrence of the incorrect updating and execution of the exception application program is carried out is executed in a program hooked into the kernel of the operating system, and in response to determining that the incorrect updating has been executed, the kernel causes the forcible termination of the first application program and issues a notification so that the execution of the exception application program is carried out and the user is notified of the occurrence of the incorrect updating.

7. An information processing apparatus, comprising:

a processor configured to operate as:

a determination unit configured to determine whether information stored in a memory of the information processing apparatus is incorrectly updated during execution of a first application program for receiving an instruction issued by a user and for controlling execution of processing corresponding to the instruction, a forcible termination unit configured to, in response to the determination unit determining that the incorrect updating has been executed, forcibly terminate the first application program, a restart control unit configured to, in response to the determination unit determining that the incorrect updating has been executed and after the forcible termination unit terminates the first application program, control execution of an exception application program that notifies the user of the occurrence of the incorrect updating and receives an instruction relating to restart of the information processing apparatus;

wherein the restart control unit controls the execution of the processing for executing the exception application program in response to determining that a flag has a first value and then sets the flag to a second value said determination unit determining whether information stored in the memory of the information processing apparatus is incorrectly updated during execution of the exception application program;

said forcible termination unit, in response to the determination unit determining that the incorrect updating has been executed during execution of the exception application program, forcibly terminating the exception application program; and said restart control unit, in response to the determination unit determining that the incorrect updating has been executed during execution of the exception application program and after the forcible termination unit terminating the application program, controlling execution of processing for rebooting or shutting down the information processing apparatus, in response to determining that the flag has the second value;

wherein an operating system having a memory protection function is implemented, processing of the determination unit and the forcible termination unit are each executed by a kernel of the operating system, and the processing of the restart control unit is executed in a program hooked into the kernel of the operating system, and in response to the determination unit determining that the incorrect updating has been executed, the kernel causes the forcible termination unit to terminate the first application program and notifies the restart control unit of the occurrence of the incorrect updating so that the restart control unit controls the execution of the exception application program to notify the user of the occurrence of the incorrect updating.

* * * * *